United States Patent
Little et al.

(10) Patent No.: US 7,295,901 B1
(45) Date of Patent: Nov. 13, 2007

(54) SYSTEM AND METHOD FOR INDICATING A POSITION OF AN AIRCRAFT TO A USER

(75) Inventors: Michael C. Little, Peoria, AZ (US); Troy A. Nichols, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/526,916

(22) Filed: Sep. 25, 2006

(51) Int. Cl.
*G06F 19/00* (2006.01)

(52) U.S. Cl. ............................................ 701/16; 342/33
(58) Field of Classification Search ................ 701/3, 701/4, 5, 6, 7, 8, 14, 16, 18, 223, 200, 120; 342/33, 34, 35
See application file for complete search history.

(56) References Cited

U.S. PATENT DOCUMENTS 5,978,715 A * 11/1999 Briffe et al. .................. 701/11
6,430,480 B1 * 8/2002 Ammar et al. ................ 701/16
6,591,171 B1 * 7/2003 Ammar et al. ................ 701/16

\* cited by examiner

*Primary Examiner*—Richard M. Camby
(74) *Attorney, Agent, or Firm*—Ingrassia Fisher & Lorenz (57) ABSTRACT

An avionics system includes a display device that is viewable by a user of an aircraft and a processor in operable communication with the display device. The processor is configured to display a digital terrain having a digital landmark thereon on the display device, the digital terrain being representative of an actual terrain and the digital landmark being representative of an actual landmark on the actual terrain, and display a plurality of position indicators over the digital terrain such that a line extending through the plurality of position indicators intersects the digital landmark, the position indicators being a fixed digital terrain distance apart as measured over the digital terrain.

20 Claims, 10 Drawing Sheets

SYSTEM AND METHOD FOR INDICATING A POSITION OF AN AIRCRAFT TO A USER

TECHNICAL FIELD

The present invention relates to an avionics system, and more particularly, to a system and method for indicating a position of an aircraft to a user.

BACKGROUND

Many modern vehicles, such as aircraft, are equipped with a wide variety of electrical and computing systems that monitor and, in some instances, control various operational aspects of the aircraft. One of the tasks often performed by these systems is to gather information from various instruments, such as a compass and an altimeter, and display the information on single display device, such as a primary flight display (PFD).

PFDs are also often used to display, typically in a perspective view, the terrain over which the aircraft is flying, including the locations of various landmarks, such as landing strips. When combined with recent advances in satellite imaging and Global Position Systems (GPS), it is possible for modern computer systems to display the terrain on the PFD with a relatively high level of detail, including three-dimensional contouring. In situations where a pilot, or other user, is trying to navigate the aircraft by viewing only the PFD (e.g., in severe weather or in a vehicle without windows), the movement, spacing, and size of the contours shown on the terrain give the pilot an indication of the altitude and speed of the aircraft. As such, the contours assist the pilot in performing various maneuvers, such as landing.

However, the process of having new equipment approved by aviation regulatory authorities often takes years. As a result, aircraft are often equipped with computer equipment that, although having been proven to be safe, lacks state-of-the-art processing performance or computing resources. Therefore, in order to save system resources, PFDs in many modern aircraft only display the terrain as a flat, planar object. Because of the lack of contouring, it is difficult for the pilot to get a sense of the altitude and/or speed (or changes in the altitude and/or speed) of the aircraft if he or she is only viewing the PFD.

Accordingly, it is desirable to provide a system and method for indicating a position of an aircraft to a user of the aircraft through an onboard display device. In addition, it is desirable to provide such a system that can provide such an indication while conserving the resources of the onboard avionics system. Furthermore, other desirable features and characteristics of the present invention will become apparent from the subsequent detailed description and the appended claims, taken in conjunction with the accompanying drawings and the foregoing technical field and background.

BRIEF SUMMARY

An avionics system is provided. The avionics system includes a display device that is viewable by a user of an aircraft and a processor in operable communication with the display device. The processor is configured to display a digital terrain having a digital landmark thereon on the display device, the digital terrain being representative of an actual terrain and the digital landmark being representative of an actual landmark on the actual terrain, and display a plurality of position indicators over the digital terrain such that a line extending through the plurality of position indicators intersects the digital landmark, the position indicators being a fixed digital terrain distance apart as measured over the digital terrain.

A method for indicating an aircraft position to a user of the aircraft is provided. A digital terrain having a digital landmark thereon is displayed on a display device viewable to the user of the aircraft. The digital terrain is representative of an actual terrain, and the digital landmark is representative of an actual landmark on the actual terrain. A plurality of position indicators are displayed over the digital terrain such that a line extending through the plurality of position indicators intersects the digital landmark. The position indicators are a fixed digital terrain distance apart as measured over the digital terrain.

BRIEF DESCRIPTION OF THE DRAWINGS

The present invention will hereinafter be described in conjunction with the appended drawing figures, wherein like numerals denote like elements, and in which.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. In this regard, the present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein.

Moreover, it should be understood that the exemplary process illustrated may include additional or fewer steps or may be performed in the context of a larger processing scheme. Furthermore, the various methods presented in the drawing figures or the specification are not to be construed as limiting the order in which the individual processing steps may be performed. It should be appreciated that the particular implementations shown and described herein are illustrative of the invention and its best mode and are not intended to otherwise limit the scope of the invention in any way. It should also be understood that FIGS. 1-10 are merely illustrative and may not be drawn to scale.

FIG. 1 to FIG. 10 illustrate an avionics system including a display device that is viewable by a user of an aircraft and a processor in operable communication with the display device. A digital terrain that is representative of an actual terrain is displayed on the display device. The digital terrain has a digital landmark thereon that is representative of an actual landmark on the actual terrain. A plurality of position indicators are displayed over the digital terrain a fixed distance apart, as measured over the digital terrain. A line, which may be substantially straight, that extends through the plurality of position indicators intersects the digital landmark. As the aircraft moves, the image of the digital terrain changes and the visible space, as measured over the display device, between adjacent position indicators changes to provide an indication of altitude and/or movement to a user of the aircraft.

Figure 1:
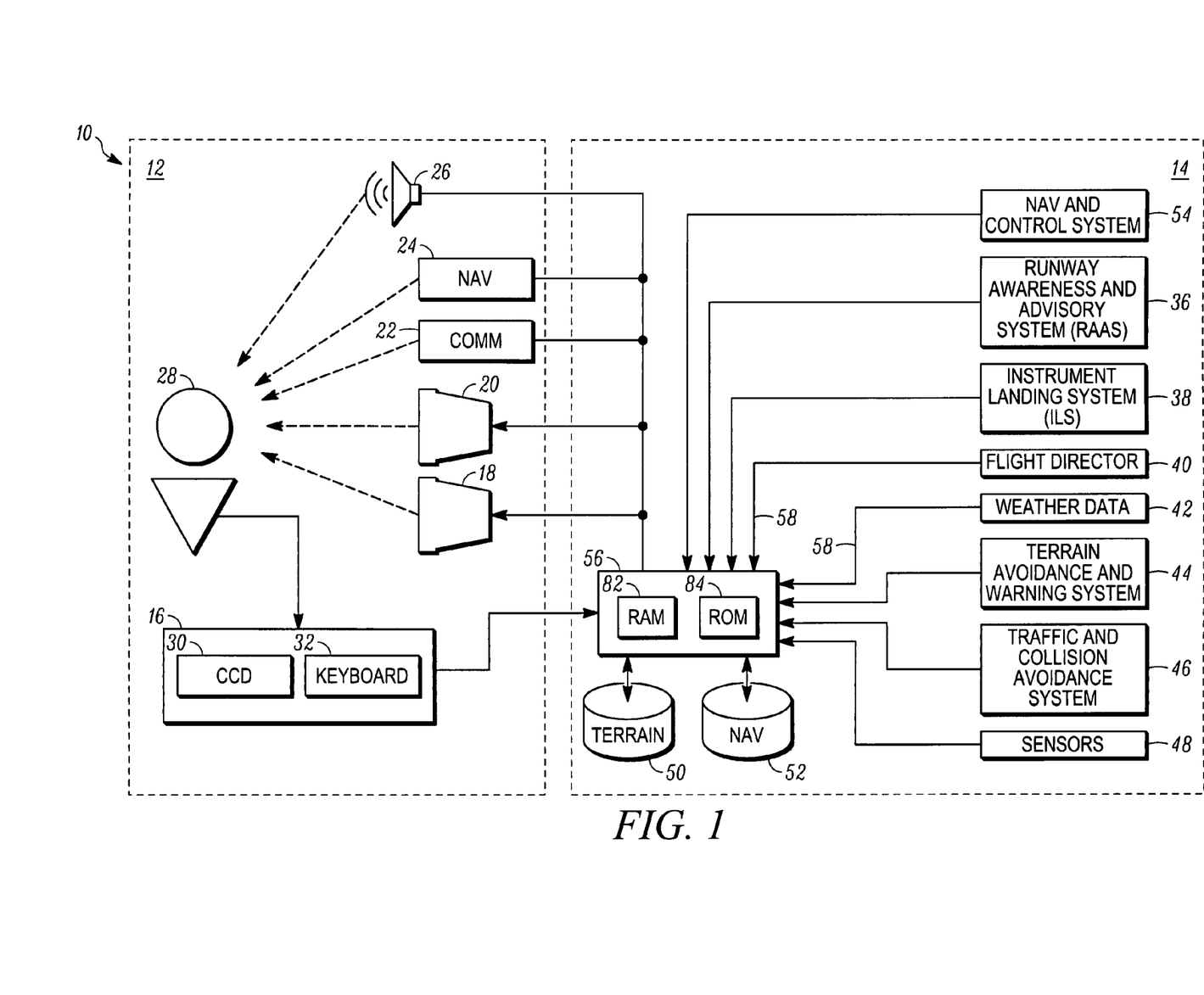
FIG. 1 is a block diagram schematically illustrating a vehicle including a flight deck and an avionics/flight system.

FIG. 1 schematically illustrates a vehicle 10, such as an aircraft, according to one embodiment of the present invention. The vehicle 10 may be, in one embodiment, any one of a number of different types of aircraft such as, for example, a private propeller or jet engine driven airplane, a commercial jet liner, or a helicopter. In the depicted embodiment, the vehicle 10 includes a flight deck 12 (or cockpit) and an avionics/flight system 14. Although not specifically illustrated, it should be understood that the vehicle 10 also includes a frame or body to which the flight deck 12 and the avionics/flight system 14 are connected, as is commonly understood. It should also be noted that vehicle 10 is merely exemplary and could be implemented without one or more of the depicted components, systems, and data sources. It will additionally be appreciated that the vehicle 10 could be implemented with one or more additional components, systems, or data sources.

In one embodiment, the flight deck 12 includes a user interface 16, a first display device 18 (e.g., a primary flight display (PFD)), a second display device 20, a communications radio 22, a navigational radio 24, and an audio device 26. The user interface 16 is configured to receive input from a user 28 (e.g., a pilot) and, in response to the user input, supply command signals to the avionics/flight system 14. The user interface 16 may be any one, or combination, of various known user interface devices including, but not limited to, a cursor control device (CCD) 30, such as a mouse, a trackball, or joystick, and/or a keyboard, one or more buttons, switches, or knobs. In the depicted embodiment, the user interface 16 includes a CCD 30 and a keyboard 32. The user 28 uses the CCD 30 to, among other things, move a cursor symbol on the display devices 18 and 20, and may use the keyboard 32 to, among other things, input textual data.

Still referring to FIG. 1, the first and second display devices 18 and 20 are each used to display various images and data, in graphic, iconic, and/or textual formats, and to supply visual feedback to the user 28 in response to user input commands supplied by the user 28 to the user interface 16. It will be appreciated that the display devices 18 and 20 may each be implemented using any one of numerous known displays suitable for rendering image and/or text data in a format viewable by the user 28, such as a cathode ray tube (CRT) displays, a LCD (liquid crystal display), a TFT (thin film transistor) displays, or a heads up display (HUD) projection.

The communication radio 22 is used, as is commonly understood, to communicate with entities outside the vehicle 10, such as air-traffic controllers and pilots of other aircraft. The navigational radio 24 is used to receive from outside sources and communicate to the user various types of information regarding the location of the vehicle, such as Global Positioning Satellite (GPS) system and Automatic Direction Finder (ADF) (as described below). The audio device 26 is, in one embodiment, an audio speaker mounted within the flight deck 12.

The avionics/flight system 14 includes a runway awareness and advisory system (RAAS) 36, an instrument landing system (ILS) 38, a flight director 40, a weather data source 42, a terrain avoidance warning system (TAWS) 44, a traffic and collision avoidance system (TCAS) 46, a plurality of sensors 48, one or more terrain databases 50, one or more navigation databases 52, a navigation and control system 54, and a processor 56. The various components of the avionics/flight system 14 are in operable communication via a data bus 58 (or avionics bus).

The RAAS 36 provides improved situational awareness to help lower the probability of runway incursions by providing timely aural advisories to the flight crew during taxi, takeoff, final approach, landing and rollout. The ILS 38 is a radio navigation system that provides aircraft with horizontal and vertical guidance just before and during landing and, at certain fixed points, indicates the distance to the reference point of landing. The flight director 40, as is generally known, supplies command data representative of commands for piloting the aircraft in response to flight crew entered data, or various inertial and avionics data received from external systems. The weather data source 42 provides data representative of at least the location and type of various weather cells. The TAWS 44 supplies data representative of the location of terrain that may be a threat to the aircraft, and the TCAS 46 supplies data representative of other aircraft in the vicinity, which may include, for example, speed, direction, altitude, and altitude trend. Although not illustrated, the sensors 48 may include, for example, a barometric pressure sensor, a thermometer, and a wind speed sensor.

The terrain databases 50 include various types of data representative of the terrain over which the aircraft may fly, and the navigation databases 52 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information.

Figure 2:
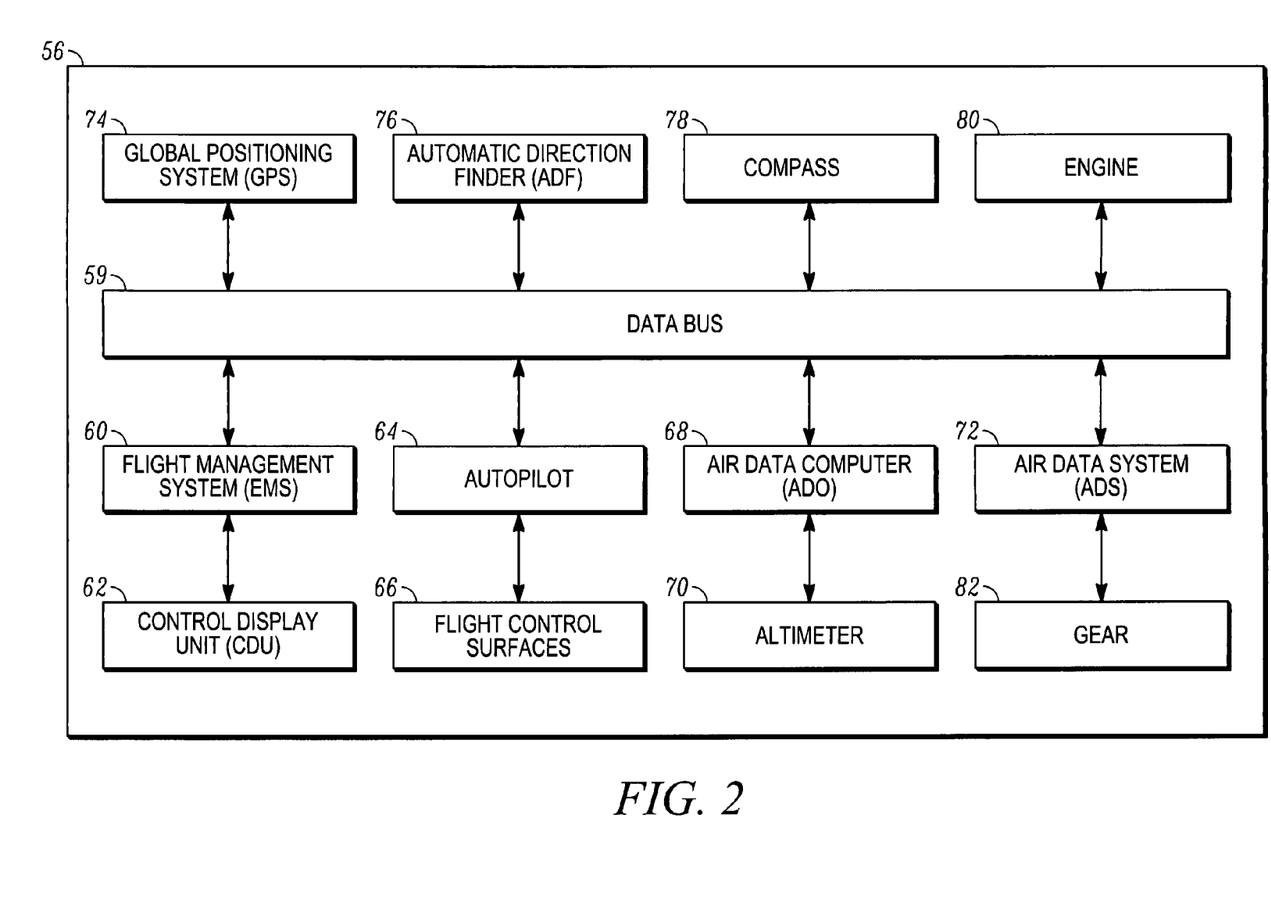
FIG. 2 is a block diagram of a navigation and control subsystem within the avionics/flight system of FIG. 1.

As illustrated in FIG. 2, the navigation and control system 54 includes a flight management system (FMS) 60, a control display unit (CDU) 62, an autopilot or automated guidance system 64, multiple flight control surfaces 66 (e.g., ailerons, elevators, and a rudder), an Air Data Computer (ADC) 68, an altimeter 70, an Air Data System (ADS) 72, a Global Positioning Satellite (GPS) system 74, an automatic direction (ADF) 76, a compass 78, at least one engine 80, and gear (i.e., landing gear) 82.

The FMS 60, in one embodiment, is a computerized avionics component that is used to assist the pilot, or pilots, in navigating and managing the vehicle 10 by utilizing various other components of the navigation and control system 56, such as the CDU 62 and the autopilot 64 shown in FIG. 2, as well as the avionics system 14 shown in FIG. 1.

Although not shown in FIG. 2, the ADS 72 may include a pitostatic tube system, as is commonly understood in the art. The navigation and control system 56 may also incorporate the data bus 59, through which the various components of the navigation and control system 56, as well as the entire vehicle 10, may be in operable communication. It should be understood that the vehicle 10 shown in FIGS. 1 and 2 is merely of an example of an embodiment of the invention. As such, the vehicle 10 may include other components, system, and subsystems, as will be appreciated by one skilled in the art, such as military devices, such as weapons and targeting systems, and additional systems, such as a Ram Air Turbine (RAT) system.

Referring now to FIG. 1, the processor 56 may be any one of numerous known general-purpose microprocessors or an application specific processor that operates in response to program instructions. In the depicted embodiment, the processor 56 includes on-board RAM (random access memory) 82, and on-board ROM (read only memory) 84. The program instructions that control the processor 58 may be stored in either or both the RAM 82 and the ROM 84. For example, the operating system software may be stored in the ROM 84, whereas various operating mode software routines and various operational parameters may be stored in the RAM 82. It will be appreciated that this is merely exemplary of one scheme for storing operating system software and software routines, and that various other storage schemes may be implemented. It will also be appreciated that the processor 58 may be implemented using various other circuits, not just a programmable processor. For example, digital logic circuits and analog signal processing circuits could also be used.

During operation, the processor 56 receives various types of information about the position and orientation of the aircraft 10 from, for example, the GPS system 74, the ADF 76, the compass 78, the altimeter 70, the ADS 72, as well information about the terrain over which the aircraft 10 is flying from, for example, the terrain and navigational databases 50 and 52 to generate a perspective view of the terrain as seen from the aircraft (e.g., through a window or a windshield).

Figure 3:
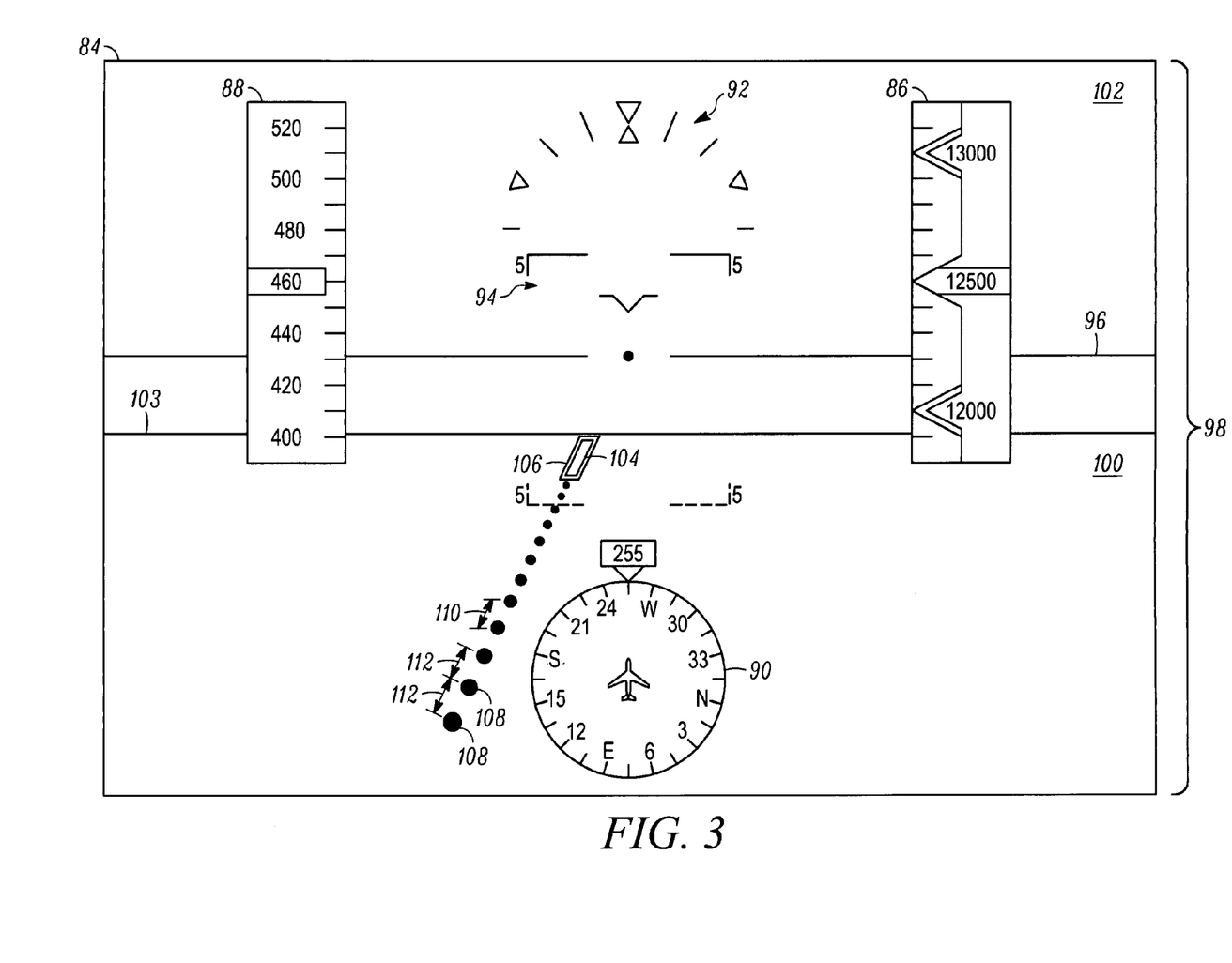
FIG. 3 is a top view of a primary flight display on the flight deck of FIG. 1 displaying a perspective view of a digital terrain with the vehicle in a first position, according to one embodiment of the present invention.

FIG. 3 illustrates a display screen (or surface) 84 of the primary flight display 18. On the display screen 84 are displayed multiple digital instruments, including an altitude indicator 86, an airspeed indicator 88, a heading indicator 90, a roll indicator 92, a pitch indicator 94 (including a horizon bar 96), and a terrain image 98. In the embodiment illustrated, the altitude indicator 86 and the airspeed indicate 88 are displayed as an altitude tape and an airspeed tape, respectively, as is commonly understood. The heading indicator 90 is graphically displayed as a compass at a lower center portion of the display screen 84. The roll indicator 92 is displayed above the heading indicator 90 at an upper portion of the display screen, and the pitch indicator 94 is positioned between the heading indicator 90 and the roll indicator 92. The horizon bar 96 extends horizontally near the center of the screen 84, through the pitch indicator 94. The digital instruments 86-94 provide an indication of a position and/or orientation (i.e., heading, pitch, roll, etc.) of the aircraft 10 to the user 28.

In the exemplary embodiment shown in FIG. 3, the terrain image 98 depicts a perspective view from the aircraft 10 of the terrain outside the aircraft 10 (or actual terrain) and covers substantially all of the display screen 84. The terrain image 98 includes a terrain portion (or digital terrain) 100, a sky portion (or digital sky) 102, and a horizon line 103. As discussed briefly above, the terrain image 98 is generated based on multiple readings from various instruments onboard the aircraft 10 that provide a current position and/or orientation (e.g., heading) of the aircraft 10 and changes as the position and/or orientation of the aircraft 10 changes.

As will be appreciated by one skilled in the art, the terrain image 98 shown in FIG. 3 indicates that the aircraft 10 is in substantially horizontal flight (in a first position with an altitude of 12500 ft.). As such, the digital terrain 100 occupies approximately a first half (i.e., a lower half) of the terrain image 98, while the digital sky 102 occupies a second half (i.e., an upper half) of the terrain image 98.

Figure 7:
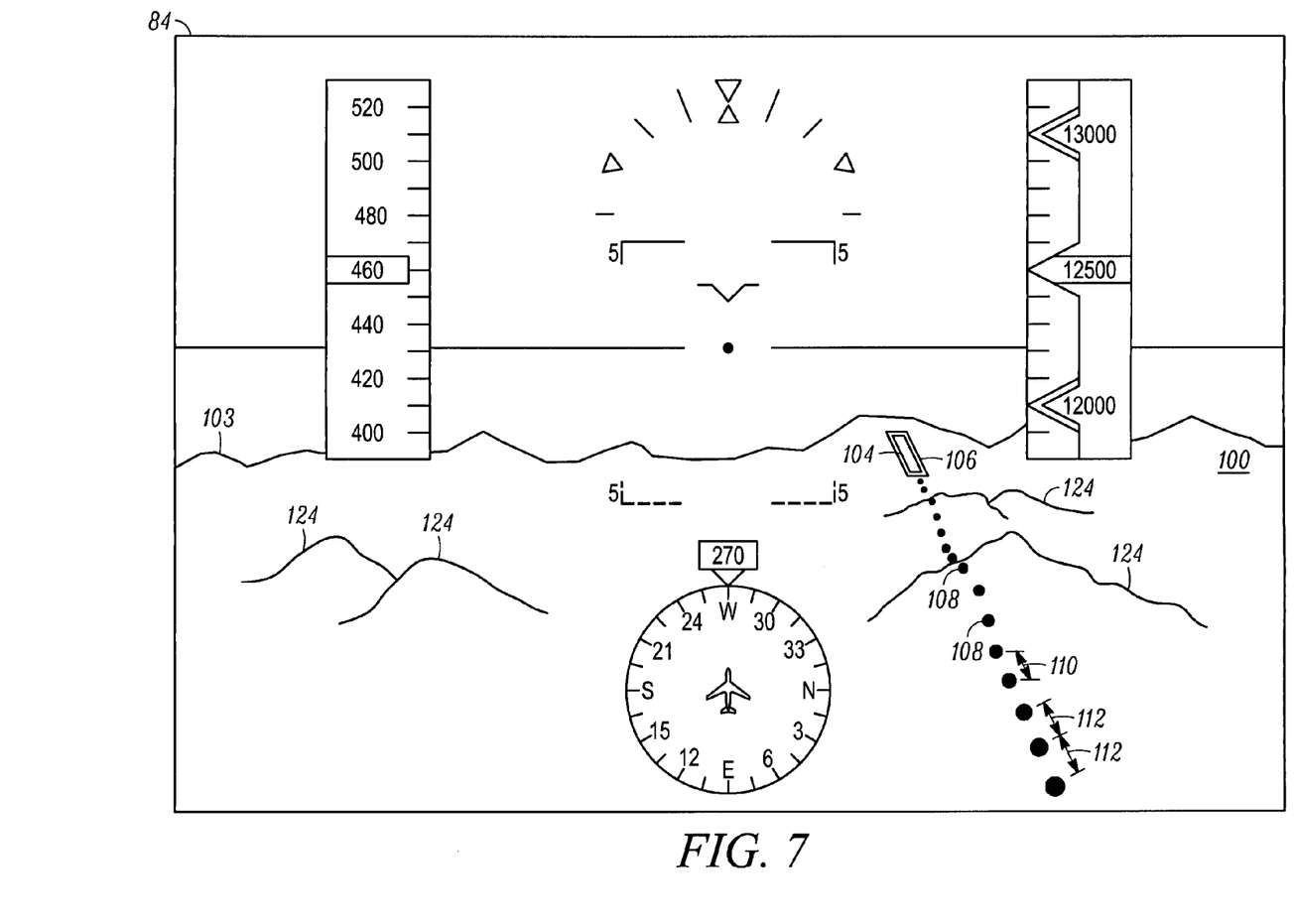
FIG. 7 is a top view of a primary flight display displaying a perspective view of a digital terrain, according to another embodiment of the present invention.
Figure 8:
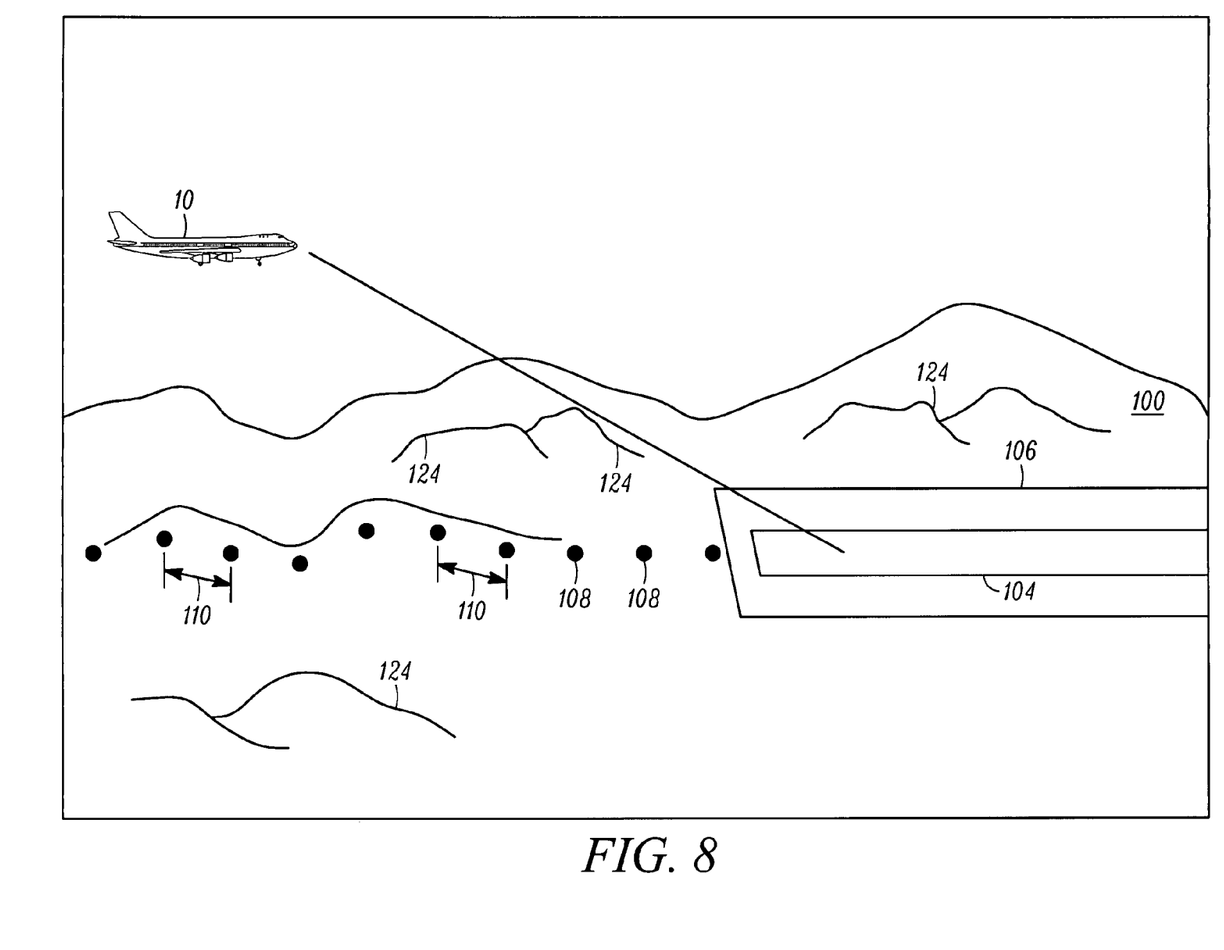
FIG. 8 a top view of a display screen of a display device displaying a third-person view of a digital terrain.

It should be noted that in the example shown in FIG. 3, the digital terrain 100 is substantially flat or planar (i.e., does not include any contours), despite the fact that the actual terrain may have contours (e.g., hills, mountains, valley, etc.), as depicted in FIGS. 7 and 8. As previously discussed, the lack of contours on the digital terrain 100 may be due to the limited performance of the processor 56 and/or limited resources of the avionics system 14 in general.

Referring again to FIG. 3, the digital terrain 100 includes a landmark (or digital landmark) 104, a landmark highlight 106, and a plurality of position indicators 108. The digital landmark 104 corresponds to and represents an actual landmark on the actual terrain positioned relative to the aircraft 10 as shown in the terrain image 98. In the depicted embodiment, the digital landmark 104, and the actual landmark, is a landing strip or runway. The landmark highlight 106 is a colored line surrounding the digital landmark 104, thus making the digital landmark 104 more visible to the user 28.

Figure 6:
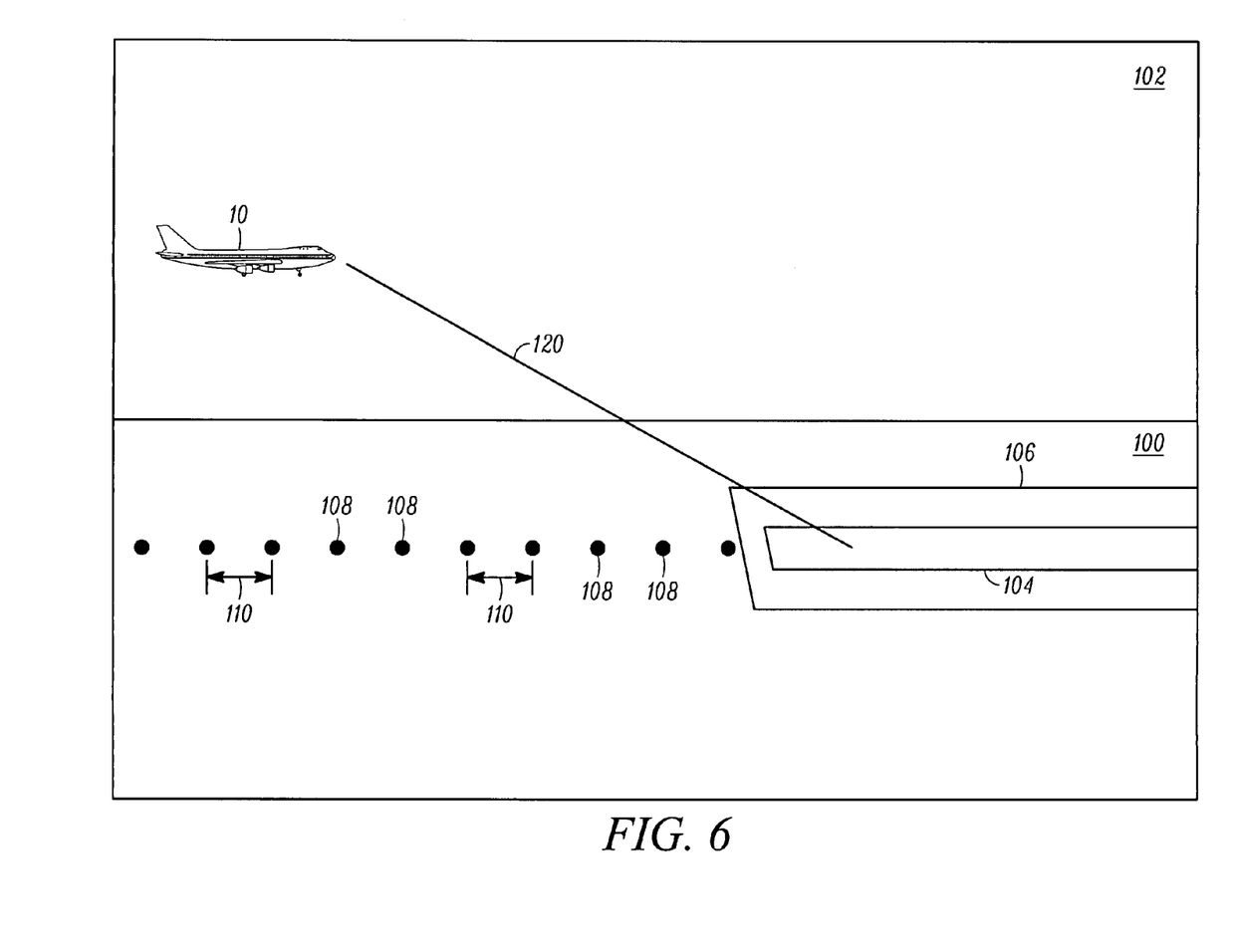
FIG. 6 is a top view of a display screen of a display device on the flight deck of FIG. 1 displaying a third-person view of a digital terrain.

The exemplary position indicators 108 shown in FIG. 3 are dots arranged in a line that intersects the digital landmark 104. Referring to FIGS. 3 and 6, the position indicators 108 are evenly spaced in fixed positions on the digital terrain 100 such that adjacent position indicators are separated by a digital terrain distance 110, as measured over the digital terrain 100. However, because the digital terrain 100 is shown in perspective, a display screen distance 112, as measured across the display screen 84, between adjacent position indicators 108 increases as the position indicators extend away from the landmark 104 or towards the aircraft 10. That is, the distance between adjacent position indicators 108, as seen by the user 28, increases as the position indicators 108 appear closer to the aircraft 10 (or a bottom edge of the display screen 84). In one embodiment, the digital terrain distance 110 corresponds to an actual distance on the actual terrain of less than 1 mile, such as, for example, between 0.2 and 0.5 miles.

Figure 4:
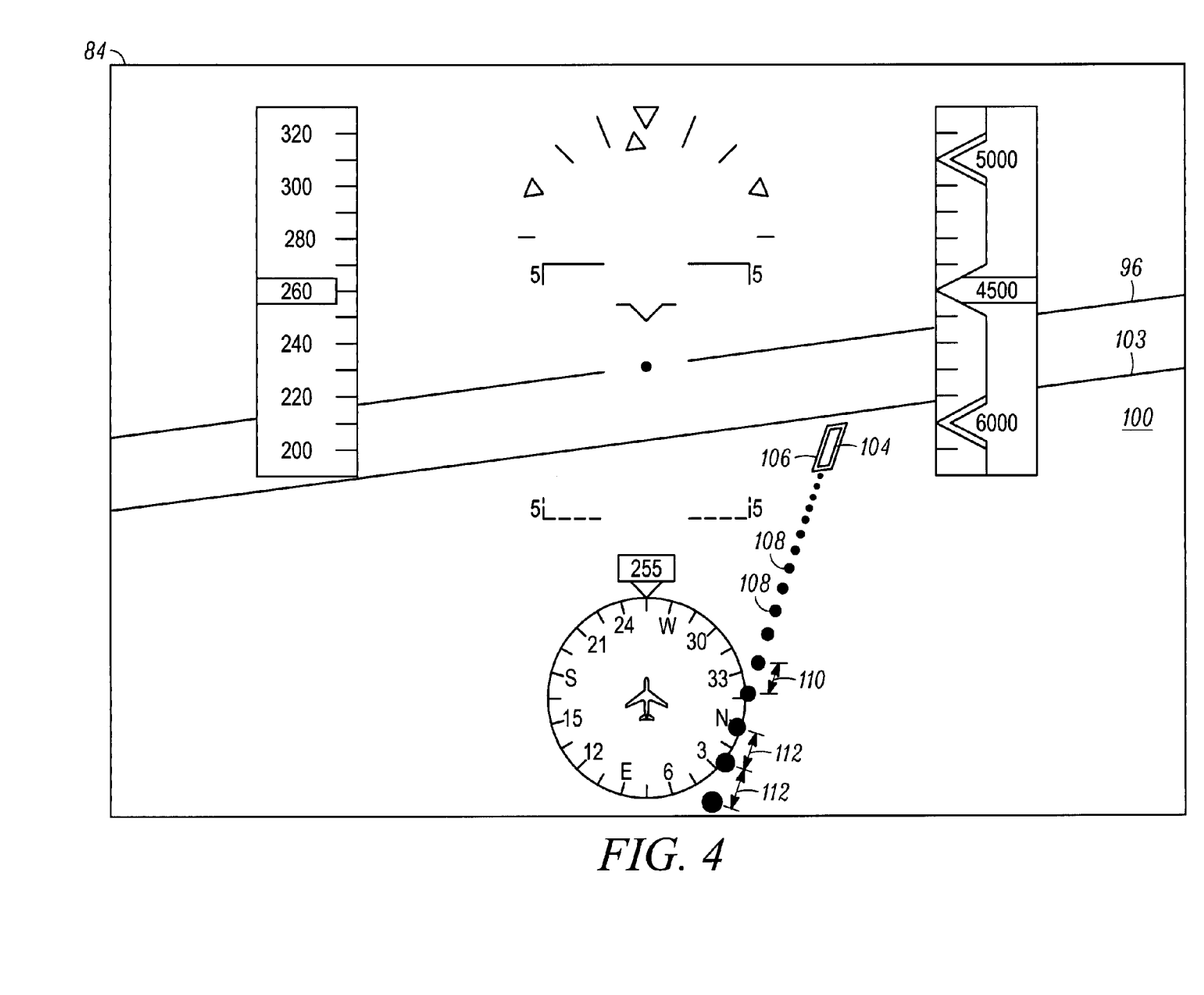
FIG. 4 is a top view of the primary flight display of FIG. 3 displaying the digital terrain with the vehicle in a second position.

FIG. 4 illustrates the display screen 84 with the aircraft in a second position. As indicated on the display screen 84, compared to the first position, the aircraft 10 is now in a closer proximity with the landmark 104 and flying at a lower altitude (e.g., 4500 ft.). Thus, the display screen distance 112 between the position indicators 108 has increased, particularly between adjacent position indicators 108 close to the bottom edge of the display screen 84, despite the fact that the digital terrain distance 110 is constant. That is, as the aircraft 10 approaches the position indicators 108 on the digital terrain 100, through either horizontal movement and/or a change in altitude, the visible space between the position indicators 108 increases such that the user 28 is provided with an additional indication of the altitude of the aircraft. Additionally, although not specifically illustrated, the speed at which the aircraft 10 appears to approach and pass over the position indicators 108 also increases as the aircraft nears the landmark 104 (assuming the airspeed is constant).

Figure 5:
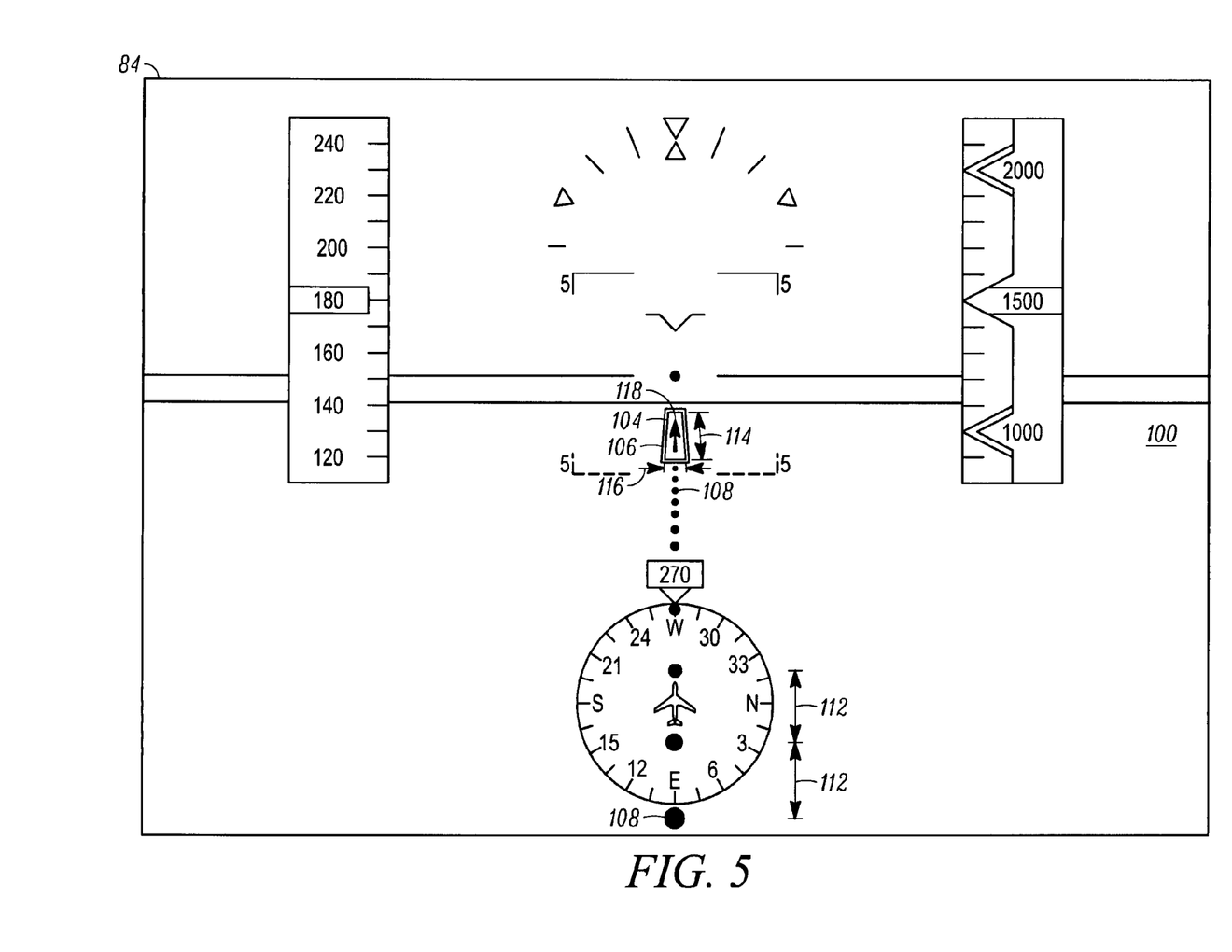
FIG. 5 is a top view of the primary flight display of FIG. 4 displaying the digital terrain with the vehicle in a third position.

FIG. 5 illustrates the display screen 84 with the aircraft 10 in a third position. Compared with the second position, the aircraft 10 is now in even closer proximity with the landmark 104 and flying at an even lower altitude (e.g., 1500 ft.). Thus, the display screen distance 112 has further increased while the position indicators 108 appear to pass by the aircraft 10 at an even greater speed. As also shown in FIG. 5, the landmark (or landing strip) 104 is substantially rectangular with a length 114 and a width 116. As is commonly understood, aircraft may land and take off from the landing strip 104 in an approach direction 118 that is substantially parallel to the length 114 of the landing strip 104. The line of position indicators 108 is also, in the depicted embodiment, substantially parallel to the approach direction 118, as the line bisects the landing strip 104.

As shown most clearly in a comparison of FIG. 4 to FIG. 5, as the aircraft 10 approaches the landmark 104 (i.e., nears the position indicators 108 and reduces altitude), in one embodiment, the displayed size (e.g., length, width, diameter, etc.) of the position indicators 108 increases to further provide the user 28 with an indication of the altitude of the aircraft 10. Thus, as shown in an exaggerated manner in FIG. 5, the position indicators 108 near the aircraft 10 may appear to be larger than the position indicators 108 near the landmark 104. In one embodiment of the present invention, the position indicators have at least one dimension (e.g., width or diameter) that is less than the digital terrain distance 110.

FIG. 6 illustrates a side view, or third-person view, of the aircraft 10 and the landmark 104 with respect to the digital terrain 100 which may be displayed on the display device 20, as shown in FIG. 1. As shown, the landmark highlight 106, the position indicators 108, and a glide path line 120 are also displayed, and the consistency of the digital terrain distance 110 between adjacent position indicators 108 is also clearly shown. The third-person view shown in FIG. 6 may be used to display a planned flight path over a particular portion of terrain, or an approach and decent (along the glide path 120) towards the landmark 104.

One advantage of the system described above is that the user is provided with an additional indication on the display of the altitude and speed of the aircraft, as well as the proximity of the aircraft to other objects. Another advantage is that the indication of the altitude and speed may be provided while the terrain is displayed without contours. Thus, processing power and/or system resources are conserved. A further advantage is that because the position indicators are aligned with the landing strip, landing the aircraft is further facilitated.

FIGS. 7 and 8 illustrate a perspective view and a third-person view, respectively, of the digital terrain 100, according to another embodiment of the present invention. In the embodiment shown in FIGS. 7 and 8, the digital terrain 100 includes multiple contours 124 which represent geographic features (e.g., mountains, hills, valleys, etc.) on the actual terrain, and the horizon line 103 has a contoured shape. The position indicators 108 displayed follow the shape of the digital terrain 100, including the contours 124, while maintaining the constant digital terrain distance 110. However, because the position indicators 108 follow the shape of the contours 124, the display screen distance 112 between adjacent position indicators may vary in an additional manner. For example, as seen in the perspective view of FIG. 7, the display screen distance 112 between position indicators 108 on a front side (as viewed on FIG. 7) of one of the contours 124 may be greater than the display screen distance 112 between position indicators 108 on a back side of the contour 124. A further advantage of the example illustrated in FIGS. 7 and 8 is that both the position indicators and the contours are displayed on the digital terrain. As a result, the user is provided with an even additional indication of the position and/or speed of the aircraft.

Figure 9:
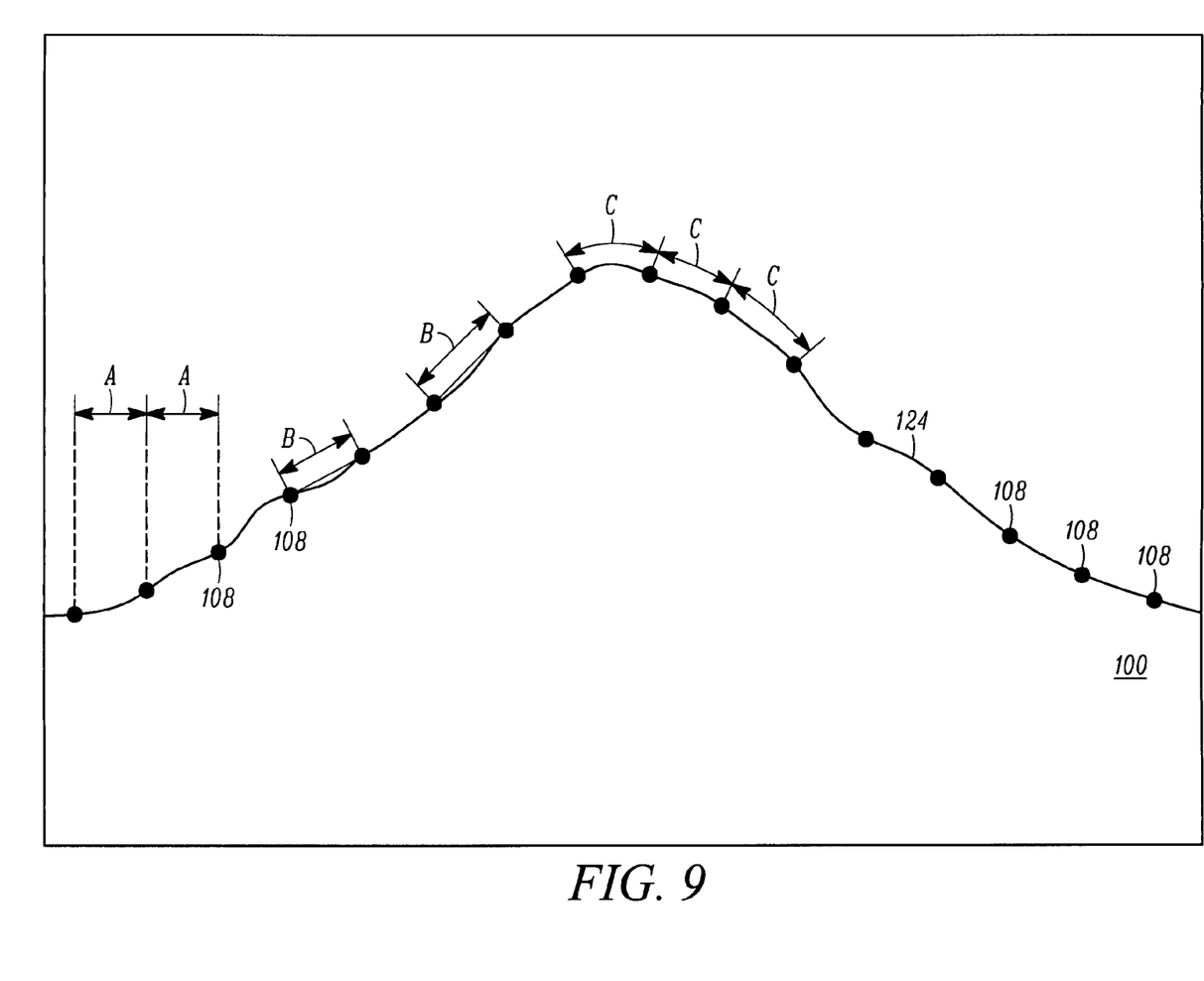
FIG. 9 is a side view of a contour on a digital terrain.

As illustrated in FIG. 9, the digital terrain distance 110, particularly when the position indicators 108 are shown over a contour 124, may represent various distances between the position indicators 108. For example, distance A indicates a digital terrain distance 110 that is measured by the horizontal distance between adjacent position indicators 108. Distance B indicates a digital terrain distance 110 that is measured by a straight line between adjacent position indicators 108. Distance C, however, is not measured in a straight line, but along the digital terrain 100, following the shape of the contour 124.

Figure 10:
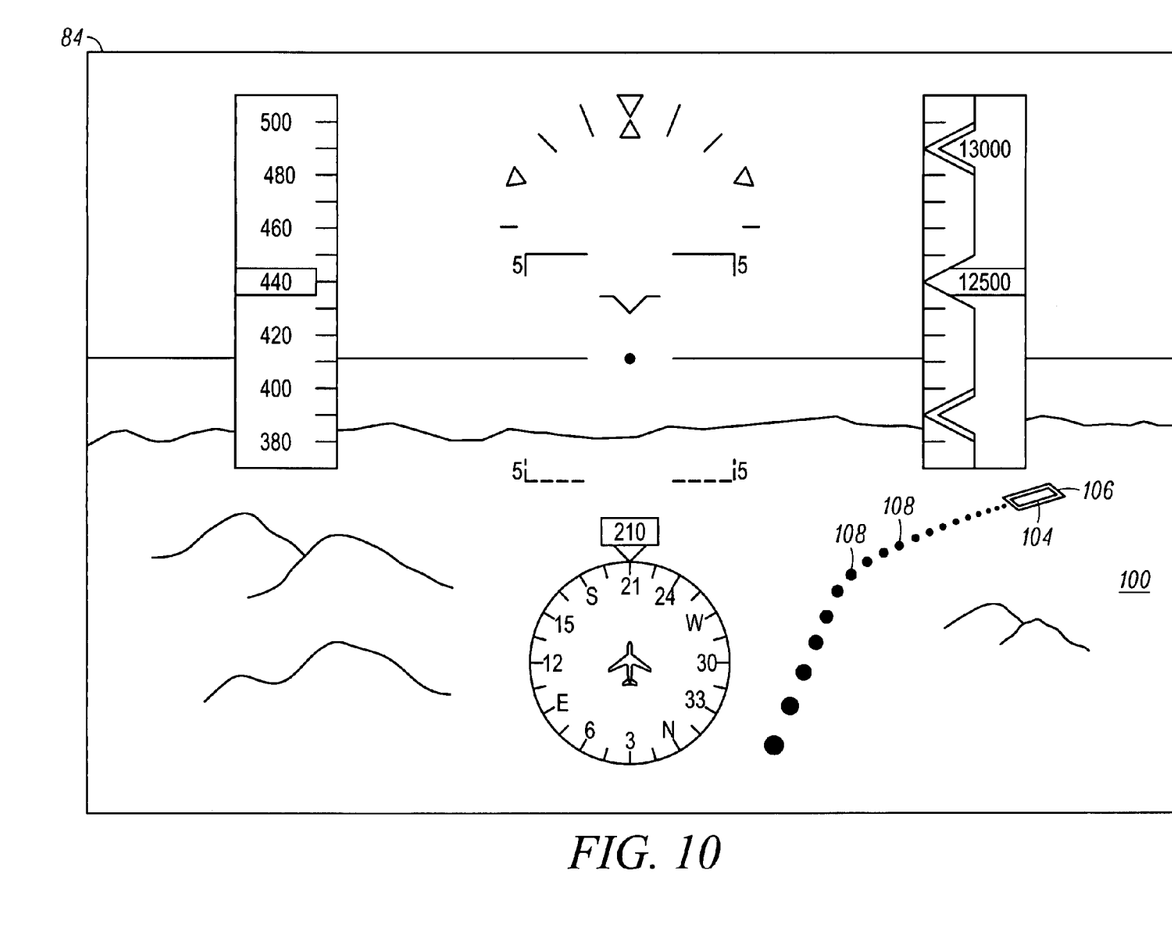
FIG. 10 is a top view of a primary flight display displaying a perspective view of a digital terrain, according to a further embodiment of the present invention.

FIG. 10 illustrates a perspective view of a digital terrain 100, according to a further embodiment of the present invention. As shown, the position indicators 108 extend from the landmark 104 in a curved fashion, as opposed to a straight line. A further advantage of the example illustrated in FIG. 10 is that the possibility of following alternative flight paths, as the aircraft 10 approaches the landmark 104, is facilitated. For example, this may be particularly useful when the landmark is located near a restricted airspace that the aircraft 10 does not have authorization to enter.

Other embodiments may utilize different sizes and shapes of position indicators. For example, three-dimensional objects, such as trees or poles, could be used as the position indicators. Although not shown, the position indicators may be used in conjunction with other markers, such as grid lines spaced a relatively large distance (e.g., 5 or 10 miles) apart. The position indicators may not appear on, or connected to, the digital terrain, but may be position a particular height above the terrain. It should also be understood that such the system and method described above may be utilized in vehicles other than aircraft, such as automobiles and watercraft.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. An avionics system comprising:
   a display device that is viewable by a user of an aircraft; and
   a processor in operable communication with the display device, the processor being configured to:
      display a digital terrain having a digital landmark thereon on the display device, the digital terrain being representative of an actual terrain and the digital landmark being representative of an actual landmark on the actual terrain; and display a plurality of position indicators over the digital terrain such that a line extending through the plurality of position indicators intersects the digital landmark, the position indicators being a fixed digital terrain distance apart as measured over the digital terrain.

2. The avionics system of claim 1, wherein the display device comprises a display surface and when the aircraft is in a first position, a first and a second of the position indicators are displayed on the display surface a first display surface distance apart as measured over the display surface, and when the aircraft is in a second position, the first and second position indicators are displayed on the display surface a second display surface distance apart.

3. The avionics system of claim 2, wherein the second display surface distance is greater than the first display surface distance, the aircraft is at a first altitude when the aircraft is in the first position and the aircraft is at a second altitude when the aircraft is in the second position, and the first altitude is greater than the second altitude.

4. The avionics system of claim 3, wherein the position indicators are displayed on the digital terrain and the line extending through the plurality of position indicators and intersecting the digital landmark is substantially straight.

5. The avionics system of claim 4, wherein the position indicators have a width, the width being less than the digital terrain distance.

6. The avionics system of claim 5, wherein the display device is a primary flight display and the processor is further configured to display an altitude indicator indicating a current altitude of the aircraft, an airspeed indicator to indicate a current airspeed of the aircraft, and a heading indicator to indicate a current heading of the aircraft on the primary flight display.

7. The avionics system of claim 6, wherein the processor is further configured to display the digital terrain on the primary flight display in a digital perspective view corresponding to an actual perspective view from the aircraft.

8. The avionics system of claim 7, wherein the actual landmark is a landing strip having a length and a width, the length extending in an approach direction, and the line extending through the plurality of position indicators is substantially parallel to the approach direction.

9. The avionics system of claim 8, wherein the actual terrain comprises a plurality contours and the digital terrain is substantially planar.

10. The avionics system of claim 2, wherein the fixed digital terrain distance is representative of an actual terrain distance as measured over the actual terrain of less than 1 mile.

11. An avionics system comprising:
a primary flight display having a display surface onboard an aircraft;
a computer-readable medium onboard the aircraft, the computer-readable medium having information representative of an actual terrain with an actual landing strip stored thereon;
a processor in operable communication with the primary flight display and the computer-readable medium, the processor configured to:
display a digital terrain with a digital landing strip a representative of the actual terrain on the primary flight display in a digital perspective view corresponding to an actual perspective view of the actual terrain from the aircraft; and display a plurality of position indicators having a width on the digital terrain, a line extending through the position indicators intersecting the digital landing strip and adjacent position indicators being separated by a fixed digital terrain distance that is greater than the width of the position indicators as measured over the digital terrain such that when the aircraft is in a first position, the adjacent position indicators are separated by a first display surface distance as measured over the display surface, and when the aircraft is in a second position, the adjacent position indicators are separated by a second display surface distance.

12. The avionics system of claim 11, wherein the first position is a first actual distance away from the landing strip and the second position is a second actual distance away from the landing strip, the first actual distance is greater than the second actual distance, and the second display surface distance is greater than the first display surface distance.

13. The avionics system of claim 12, wherein the digital landing strip has a length and a width, the length extending in an approach direction, the line extending through the position indicators and intersecting the digital landing strip being substantially parallel to the approach direction.

14. The avionics system of claim 13, wherein the actual terrain has a plurality of actual contours thereon and the digital terrain is substantially planar.

15. The avionics system of claim 13, wherein the actual terrain has a plurality of actual contours thereon and the digital terrain has a plurality of digital contours thereon representative of the actual contours, the position indicators following the digital contours.

16. A method for indicating an aircraft position to a user of the aircraft comprising:
displaying a digital terrain having a digital landmark thereon on a display device viewable to the user of the aircraft, the digital terrain being representative of an actual terrain and the digital landmark being representative of an actual landmark on the actual terrain; and
displaying a plurality of position indicators over the digital terrain such that a line extending through the plurality of position indicators intersects the digital landmark, the position indicators being a fixed digital terrain distance apart as measured over the digital terrain.

17. The method of claim 16, wherein the display device comprises a display surface and when the aircraft is in a first position, a first and a second of the position indicators are displayed on the display surface a first display surface distance apart as measured over the display surface, and when the aircraft is in a second position, the first and second position indicators are displayed on the display surface a second display surface distance apart.

18. The method of claim 17, wherein the second display surface distance is greater than the first display surface distance, the aircraft is at a first altitude when the aircraft is in the first position and the aircraft is at a second altitude when the aircraft is in the second position, and the first altitude is greater than the second altitude.

19. The method of claim 18, wherein the display device is a primary flight display and the processor is further configured to display an altitude indicator indicating a current altitude of the aircraft, an airspeed indicator to indicate a current airspeed of the aircraft, and a heading indicator to indicate a current heading of the aircraft on the primary flight display.

20. The method of claim 19, wherein the digital terrain is displayed on the primary flight display in a digital perspective view corresponding to an actual perspective view from the aircraft.

* * * * *